(12) United States Patent
Guttman et al.

(10) Patent No.: US 11,161,119 B2
(45) Date of Patent: Nov. 2, 2021

(54) SINGLE VIAL MANUAL MAGNETIC STAND AND/OR HOLDER

(71) Applicant: DH Technologies Development Pte. Ltd., Singapore (SG)

(72) Inventors: Andras Guttman, San Diego, CA (US); Marton Szigeti, Budapest (HU)

(73) Assignee: DH Technologies Development Pte. Ltd., Singapore (SG)

( * ) Notice: Subject to any disclaimer, the term of this patent is extended or adjusted under 35 U.S.C. 154(b) by 295 days.

(21) Appl. No.: 16/302,306

(22) PCT Filed: May 24, 2017

(86) PCT No.: PCT/IB2017/053064
§ 371 (c)(1),
(2) Date: Nov. 16, 2018

(87) PCT Pub. No.: WO2017/203448
PCT Pub. Date: Nov. 30, 2017

(65) Prior Publication Data
US 2019/0299215 A1 Oct. 3, 2019

Related U.S. Application Data

(60) Provisional application No. 62/342,651, filed on May 27, 2016.

(51) Int. Cl.
*B01L 9/06* (2006.01)
*B03C 1/01* (2006.01)
*G01N 35/00* (2006.01)
*B03C 1/28* (2006.01)
*B03C 1/033* (2006.01)

(52) U.S. Cl.
CPC .................. *B01L 9/06* (2013.01); *B03C 1/01* (2013.01); *B03C 1/0332* (2013.01); *B03C 1/288* (2013.01); *G01N 35/00* (2013.01); *B01L 2200/087* (2013.01); *B03C 2201/18* (2013.01); *B03C 2201/26* (2013.01); *G01N 35/0098* (2013.01)

(58) Field of Classification Search
None
See application file for complete search history.

(56) References Cited

U.S. PATENT DOCUMENTS

| | | | | |
|---|---|---|---|---|
| 4,407,958 A * | 10/1983 | DeGraff, Jr. | .............. | B01L 9/06 211/194 |
| 4,895,650 A | 1/1990 | Wang | | |
| 5,409,667 A * | 4/1995 | Elson | ........................ | B01L 9/06 211/60.1 |

(Continued)

OTHER PUBLICATIONS

International Search Report and Written Opinion for PCT/IB2017/053064 dated Aug. 31, 2017.

*Primary Examiner* — Jill A Warden
*Assistant Examiner* — Brittany I Fisher

(57) ABSTRACT

A holder that can be used to stand up a PCR tube on a flat surface or held in a user's hand. The holder has a first elongated portion, a second elongated portion and a third elongated portion. The first elongated portion having a magnet, the second elongated portion having a tube holding means and the third elongate portion acting as a stabilizer to allow the holder to standup in an upright position. The third elongate portion can also be used as a gripping surface to be held between fingers of a hand.

20 Claims, 5 Drawing Sheets

(56) References Cited

U.S. PATENT DOCUMENTS

| | | | |
|---|---|---|---|
| 5,571,481 A | 11/1996 | Powell et al. | |
| 6,193,892 B1 | 2/2001 | Krueger et al. | |
| 7,829,026 B2 * | 11/2010 | Su | G01N 35/0098 |
| | | | 422/527 |
| 2011/0031168 A1 | 2/2011 | Ellis et al. | |
| 2013/0026104 A1 * | 1/2013 | El-Fahmawi | B03C 1/01 |
| | | | 210/695 |
| 2015/0336102 A1 | 11/2015 | Tyagi et al. | |
| 2017/0080431 A1 * | 3/2017 | Eberle | C12M 23/48 |

\* cited by examiner

SINGLE VIAL MANUAL MAGNETIC STAND AND/OR HOLDER

RELATED APPLICATIONS

This application claims the benefit of priority from U.S. Provisional Application Ser. No. 62/342,651, filed on May 27, 2016, the entire contents of which are hereby incorporated by reference.

FIELD

This invention relates to a holder/stand that can be used to hold a tube or vial that contains magnetic particles.

BACKGROUND

Polymerase chain reaction (PCR) is a well established technique utilized to replicate DNA. These reactions are commonly performed in very small volumes and are typically performed in PCR tubes. Examples of such tubes as well as holders/stands for such devices are disclosed in U.S. Pat. No. 5,710,381, incorporated by reference herein. The holders for such tubes are primarily designed for use in automated techniques and can hold many different vials. Liquid is added and removed from the vials at various stages of the PCR.

The PCR technique when performed in an automated manner, utilizes magnetic beads that are inserted into the PCR tube and can be used for various purposes including mixing, or providing a base substrate onto which reactions can be performed. These magnetic particles can contaminate any liquid that is removed from the tube and as such it is imperative that these magnetic particles are prevented from contaminating any liquid that is removed from the tube. In PCR tube holding stands, the placement of individual magnets positioned to be adjacent to the tube achieves this by creating a magnetic field that penetrates into the tube that attracts and concentrates the magnetic particles to a sidewall of the tube. The liquid in the tube, the so called supernatant, can then be removed by inserting a non-magnetizable pipette or use of other liquid withdrawing techniques without fear of magnetic particle contamination.

While multi tube holding stands are used in automated processes, where machines can replicate precise movements exactly, such stands are cumbersome to use manually when an operator must use visual cues to ensure that pipette insertion does not disrupt the magnetic particles and cause contamination of the pipette tip on withdrawal. There is thus a need for a simplified tube holding stand that can be used for manual operation of individual samples.

SUMMARY

According to various embodiments, methods and apparatuses are described that can be used to hold a tube in an upright position while resting on a surface or can be used in holding the tube in a user's hand.

According to various embodiments, a tube holder is disclosed, the tube holder comprising a first elongated portion extending from a first end to a second end, the second end having a first stabilizing means for stabilizing the tube holder in an upright position when on a planar surface in at least a first direction, the first elongated portion having a first and a second surface, the first and second surfaces generally facing away from one another, the second elongated portion positioned and attached at the first end, the second elongated section extending away from the first surface of the first elongated portion, an angle ($\theta_1$) between the first elongated and second elongated portions being between 75 and 105 degrees, the second elongated portion comprising tube holding means for holding a PCR tube in a position substantially parallel to the first elongated portion, a third elongated portion that extends away from the first elongated portion on the second surface, the third elongated portion attaching to the first elongated portion at a position between the first and second end, an end of the third elongated portion opposite the first elongated portion containing second stabilizing means for stabilizing the tube holder in an upright position when on a planar surface in at least a second direction that is orthogonal to the first direction, a magnet mounted on the first surface at a position between the first and second end.

In various embodiments, a magnet is mounted between the positioning of the third elongated portion and the second end of the tube holder. In various embodiments, the angle ($\theta_1$) is 90 degrees. In various embodiments, an angle ($\theta_2$) between the second elongated portion and the third elongated portion is between 80 and 110 degrees. In various embodiments, the tube holding means comprises an aperture that extends through the thickness of the second elongated portion, the aperture being sized so as to slidably receive and hold the PCR tube. In various embodiments, the first and second stabilizing means comprise rectangular shaped legs and in various embodiments, the rectangular shaped legs are an extension of the shape of the first and third elongated portions According to various embodiments, a PCR tube holder is disclosed, the PCR tube holder comprising: a rectangular plate portion having two short sides and two long sides, the rectangular portion extending from a first end at one of the short sides to a second end at the other of the two short sides, the rectangular plate portion having a first surface and a second surface, the first and second surfaces being opposing surfaces of the rectangular plate portion that face away from one another, a tube holding portion that comprises a rectangular holding plate that extends away the first surface at the first end, an angle ($\theta_1$) between the first surface and the rectangular holding plate being between 75 and 105 degrees, the rectangular holding plate having an aperture that penetrates through a thickness of the rectangular holding plate, the aperture being sized so as to be able to slidingly receive and hold a PCR tube; a stabilizing portion that comprises a rectangular stabilizing plate that extends away from the second surface at a stabilizing plate position, the stabilizing plate position being disposed between the first end and second end, an angle ($\theta_2$) between the stabilizing portion and the second surface being between approximately 80 and 110 degrees, a magnetic holding means positioned on the first surface at a position between the second end and the stabilizing position.

In various embodiments, the magnetic holding means comprises an aperture that penetrates through a thickness of the rectangular plate portion. In various embodiments, the magnetic holding means holds a magnet. In various embodiments, the angle ($\theta_1$) between the first surface and the rectangular holding plate is between 80 and 110 degrees. In some embodiments, the angle ($\theta_1$) between the first surface and the rectangular holding plate is 90 degrees. In various embodiments, the stabilizing portion has a first stabilizing surface and a second stabilizing surface, the first and second stabilizing surfaces being on opposite sides of the rectangular stabilizing plate, a thickness between the first and second stabilizing surfaces being thinner at a point situated between two ends of the stabilizing portion than it is at one or both ends of the rectangular stabilizing plate. In various embodiments, the thickness varies from a first thickness at both ends of the stabilizing portion, to a second thickness at substantially the midpoint of the stabilizing portion, wherein the second thickness is less than the first thickness. In various embodiments, each of the rectangular plate portion, the stabilizing portion and the tube holding portion form a unitary piece. In various embodiments, the tube holder is made of a semi-rigid material. In various embodiments, the tube holder is 3d-printed or injection molded.

According to various embodiments, a method of removing liquid from a tube containing magnetic particles is disclosed, the method comprising providing a tube holder, the tube comprising: a rectangular plate portion having two short sides and two long sides, the rectangular portion extending from a first end at one of the short sides to a second end at the other of the two short sides, the rectangular plate portion having a first surface and a second surface, the first and second surfaces being opposing surfaces of the rectangular plate portion that face away from one another, a tube holding portion that comprises a rectangular holding plate that extends away the first surface at the first end, an angle between the first surface and the rectangular holding plate being between 75 and 105 degrees, the rectangular holding plate having an aperture that penetrates through a thickness of the rectangular holding plate, the aperture being sized so as to be able to slidingly receive and hold a tube; a stabilizing portion that comprises a rectangular stabilizing plate that extends away from the second surface at a stabilizing position, the stabilizing position being disposed between the first end and second end, an angle between the stabilizing portion and the second surface being approximately 80-110 degrees, a magnetic holding means positioned on the first surface at a position between the second end and the stabilizing position, a magnet attached to the magnetic holding means; inserting the tube into the aperture in a direction from the first end to the second end, holding the tube holder such that first and second fingers of a user's hands engage opposing sides of the stabilizing portion, pushing the tube towards the magnet with a thumb of the user's hands; capturing magnetic particles against an inner side wall of the tube by use of a magnetic field from the magnet; removing the liquid from the tube.

In various embodiments, removing of the liquid comprises inserted a pipette in to the tube and applying a suction force to the pipette so as to draw liquid from the tube into the pipette. In various embodiments, the first and second fingers are the index and middle fingers.

BRIEF DESCRIPTION OF THE DRAWINGS

The skilled person in the art will understand that the drawings, described below, are intended for illustration purposes only. The drawings are not intended to limit the scope of the present teachings in any way.

DETAILED DESCRIPTION OF PREFERRED EMBODIMENTS

Persons skilled in the art will understand that the devices and methods described herein are intended to be non-limiting exemplary embodiments and that the scope of the present disclosure is defined solely by the claims. While the present teachings are described in conjunction with various embodiments, it is not intended that the present teachings be limited to such embodiments. On the contrary, the teachings described herein are intended to encompass various alternatives, modifications, and equivalents, as will be appreciated by those of ordinary skill in the art. The features illustrated or described in connection with one exemplary embodiment may be combined with the features of other embodiments. Such modification and variations are intended to be included within the scope of the present disclosure.

While various parts are described in the within teachings, it should be appreciated that like parts in various Figures are identified using identical part numbers. For ease of reference and for sake of simplicity, not all parts of each figure have been labelled though persons skilled in the art upon review of the within teachings would be able to identify the depicted parts, as necessary.

According to various embodiments, methods and apparatuses are described that can be used to hold various liquid containing tube or vials. While exemplary tubes and/or vials are specifically referred to in the present teachings, it should be appreciated that any container intended to contain a liquid can be utilized in the present teachings and that any reference to a vial or tube are intended to describe the same structure. While specific vials/tubes that are embodied herein may contain a lid or cap used to close and/or seal the tube, such a feature is not necessary and that it would be understood that the presence or absence of a cap does not deter the skilled reader from using the methods and devices described herein in their intended way.

Preferred tubes to be utilized in the present teachings are PCR tubes, however as would be appreciated, the moniker of "PCR tubes" is intended to describe a type of tube that is known in the art and is not intended to limit the type of applications for which the present teachings are intended to be used for. For example, it is not intended that the within methods and devices be utilized only when performing "PCR" type reactions (i.e., Polymerase chain reaction), rather any application which may utilize such a tube, even if it does not specifically involve a PCR reaction is intended to be included.

Figure 1A:
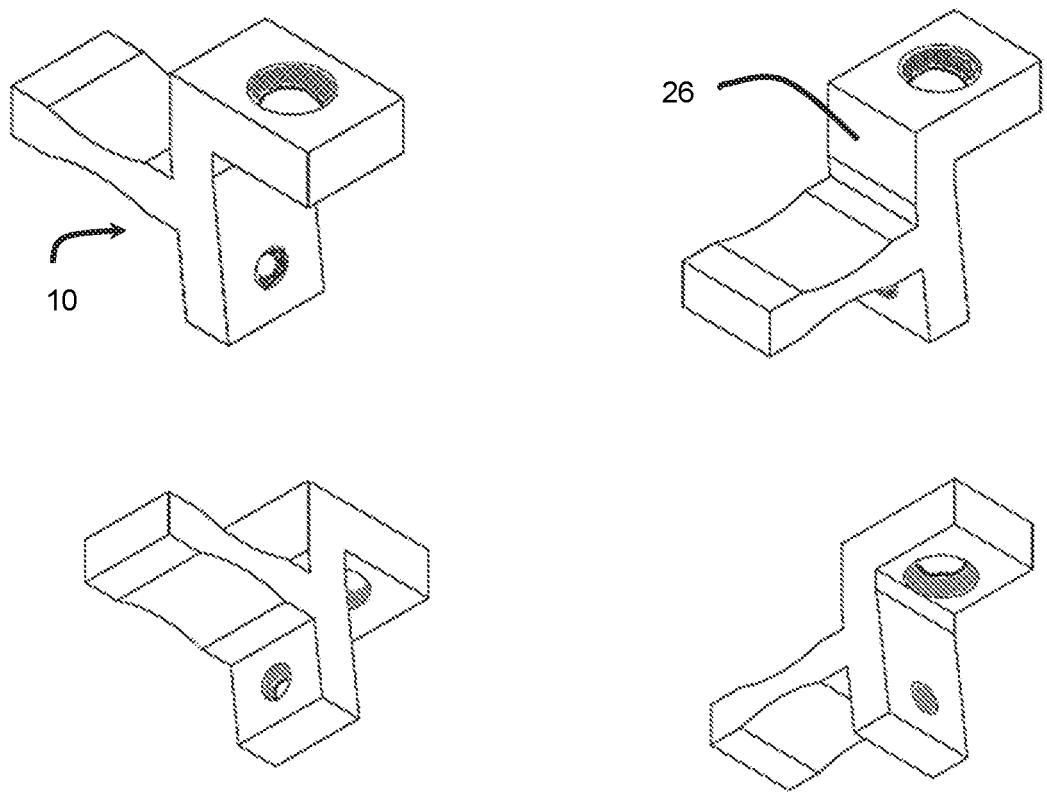
FIG. 1A exemplifies various perspective view of an embodiment of the present teachings.
Figure 1B:
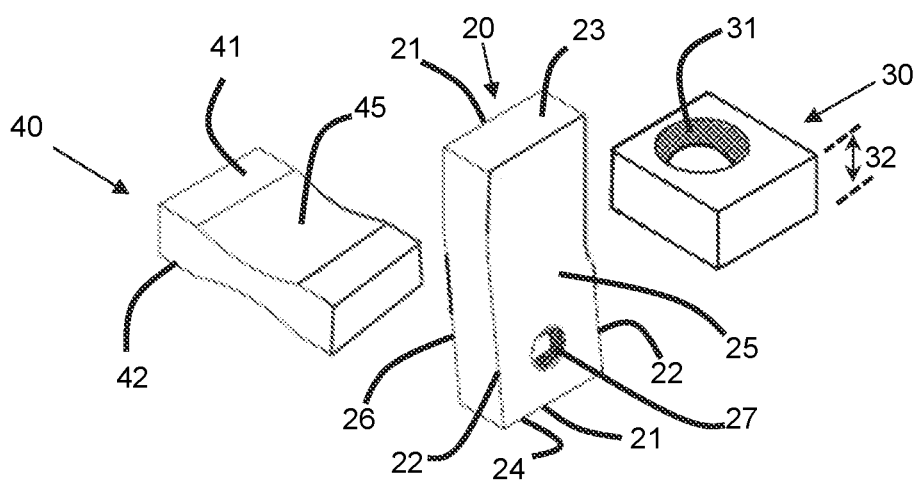
FIG. 1B exemplifies an exploded view of an embodiment of the present teachings.

FIG. 1A depicts various perspective views of a preferred embodiment of a tube holder 10 of the present teachings, the various parts of which are more easily discernable by reference to the exploded view depicted in FIG. 1B. The tube holder 10 comprises three separate plate portions (20, 30, 40). Rectangular plate shaped portion 20 has four sides with two of the sides 21 being the short sides and two of the sides 22 being long. Each of the two short sides 21 defining a first end 23 and a second end 24. The two short sides and two long sides define a first surface 25 and a second surface 26. The first 25 and second 26 surfaces being opposing surfaces that face away from one another that define two opposite sides of the rectangular plate 20. Rectangular holding plate 30 defines a tube holding portion that extends away from the first end 23 of the plate portion 20 at an angle ($\theta_1$) between the first surface and the rectangular plate that is approximately 90 degrees, though the angle can vary between +/−15 degrees (i.e., 75 and 105 degrees). The rectangular holding plate 30 has an aperture 31 that penetrates through a thickness 32 of the rectangular holding plate 30. The rectangular holding plate 30 is attached to the rectangular plate portion 20 at the first end 23. The optimum diameter and shape of the aperture 31 can be determined by a person of ordinary skill and is chosen so as to slidingly receive and hold a tube 100. The size of the aperture will vary depending on the size of the tube 100 being utilized. For 20 mm (long) sized tubes, the most preferred aperture size is 6 mm. The aperture size is generally larger than the diameter of the lower portion of the tube 100 so as to allow the easy insertion of the tube 100 into the aperture 31. However, the diameter of the aperture 31 will be less than the diameter of a lip 101 of the tube 100 so as to prevent the tube from completely passing through the aperture. In other embodiments, if the tube 100 contains sidewall that form a taper in which the diameter of the upper portion of the tube is larger than the lower portion of the tube. The aperture 31 can have an intermediate diameter to these two diameters. This allows the initial insertion of the tube into the aperture, which then stops at the point when the diameter of the tube exceeds the size of the aperture 31. While the size of the aperture 31 is depicted as being generally circular in shape, it should be appreciated that the shaping of the aperture 31 can be any size which allows a tube 100 to be inserted therethrough. For example, the aperture can be triangle shaped, quadrilateral (such as a square or rectangle), pentagon shaped or any other polygon type shape with varying number of sides. The aperture can also be oval shaped. The aperture may also comprise a combination of two of more of the various shapes referred to above. An exemplary embodiment has the aperture comprising a half circle for one half and a triangle portion for the other half. While the diameter of the aperture 31 can be consistent through the thickness of the holding plate, it should be appreciated that the sizing of the diameter may also vary with the thickness. For example, the diameter at an entrance portion of the aperture may be wider or narrower than the diameter at the exit portion of the aperture. The tube 100 is held in a position that is substantially parallel to the length of the rectangular plate portion 20 though slight variations in orientation between the tube 100 and plate portion 20 would achieve the same effect. As such substantially parallel should be understood to include variations of between 0 and 25 degrees from being perfectly parallel.

Figure 2:
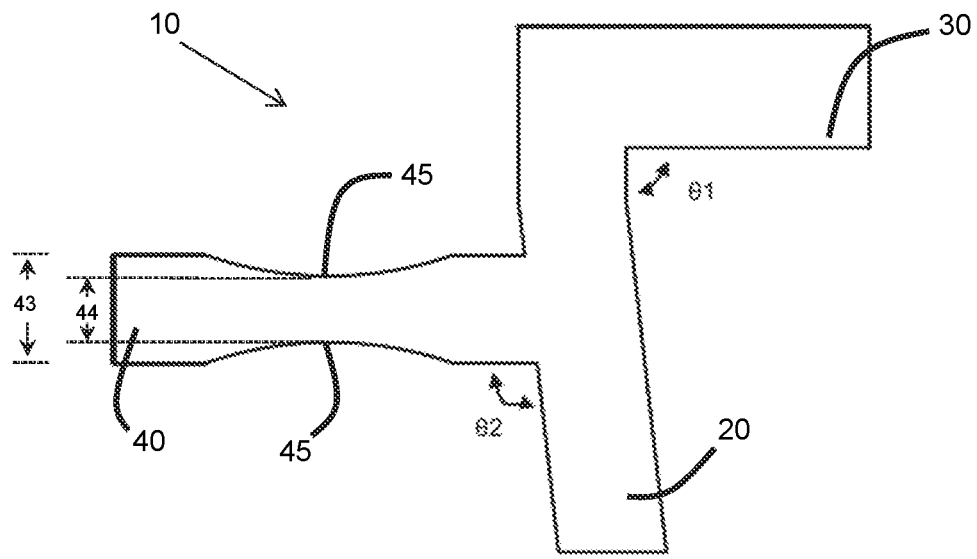
FIG. 2 exemplifies a side view of an embodiment of the present teachings.

The tube holder 10 also contains a stabilizing portion that comprises a rectangular stabilizing plate 40 that extends away from and is attached to the second surface 26 of the rectangular plate shaped portion 20. The location on the second surface 26 of the rectangular plate shaped portion 20 is somewhere between the first end 23 and second end 24. Preferably, the positioning of the stabilizing plate 40 is at the approximate midway point between the first 23 and second 24 ends though this can vary such that the positioning is between approximately 25% and 75% of the total length of the rectangular plate portion 20. An angle $\theta_2$ between the rectangular plate portion 20 and the stabilizing plate 40 is approximately 95 degrees though can vary +/−15 degree (i.e., between 80-110 degrees). In some embodiments, the angle $\theta_2$ can be 97 degrees. The definitions of these angles is more particularly defined by reference to FIG. 2 which depicts a side view of an exemplary embodiment of the tube holder 10 with reference angles $\theta_1$ and $\theta_2$. The rectangular plate portion has a first stabilizing surface 41 and a second stabilizing surface 42 that face away from one another and define opposite sides of the stabilizing plate 40. The rectangular plate has a thickness that varies between a first thickness 43 that is situated at either end of the stabilizing plate 40 and a second thickness 44 that is situated at a point approximately half way in between the two ends. This variance in thickness can define a depression 45 in one or both of the stabilizing surfaces (41,42). These depression(s) can function as an ergonomic finger rest or gripping surface when the stabilizing plate 40 is inserted between the lengths of two fingers (not shown) of a user. The two fingers can then be forced together which grips the holder and clamps down on the two stabilizing surfaces to allow a secure hold of the tube holder 10 in an ergonomic manner.

In an exemplary embodiment, the rectangular portion 20 also contains a magnet holding means in the form of an aperture 27 which serves as the location into and/or onto which a magnet may be attached and/or inserted. The aperture 27 may penetrate through the entirety of the thickness of the rectangular portion 20 or partway through. If the aperture only penetrates partway through the thickness of the rectangular portion 20, the opening of the aperture should be situated on the first surface 25. Generally, the magnetic holding means is so chosen so as to mountingly accept a magnet onto the first surface 25 of rectangular portion 20. The magnetic holding means may also be an adhesive onto which a magnet (such as a permanent magnet) may be placed. The positioning of the aperture 27 is so placed such that it is located generally towards the second end 24 of the rectangular portion 20. In an exemplary embodiment, the aperture 27 is disposed in the rectangular portion 20 between the second end 24 of the rectangular portion and the location of the stabilizing plate. In some embodiments, the aperture 27 is located between the second end 24 and the midpoint of the rectangular plate portion 20.

Figure 3:
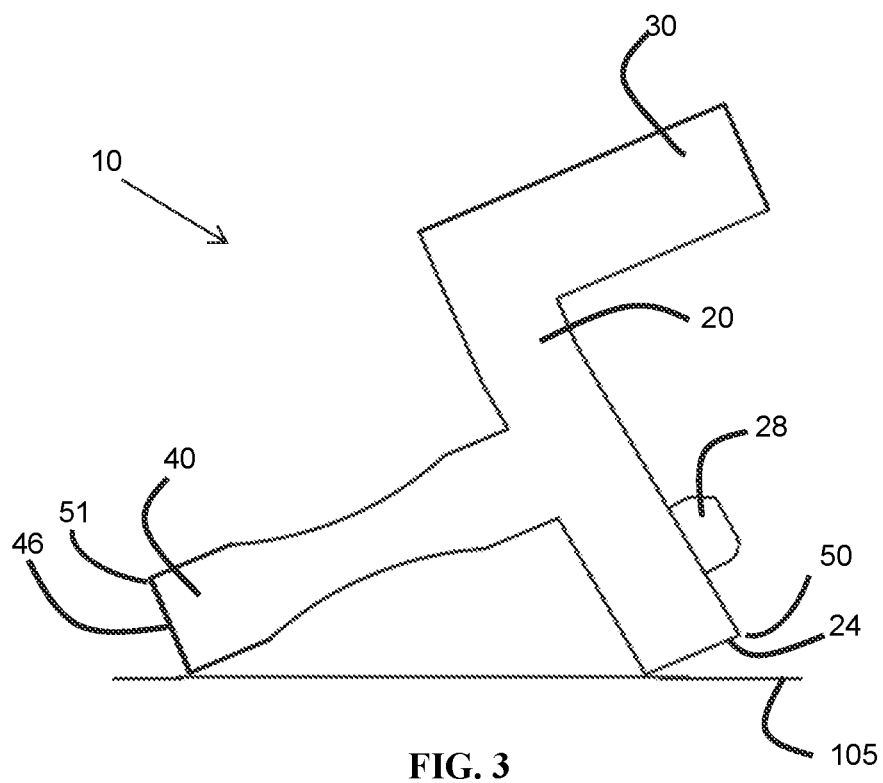
FIG. 3 exemplifies a side view of an embodiment of the present teachings resting on a flat surface.
Figure 5:
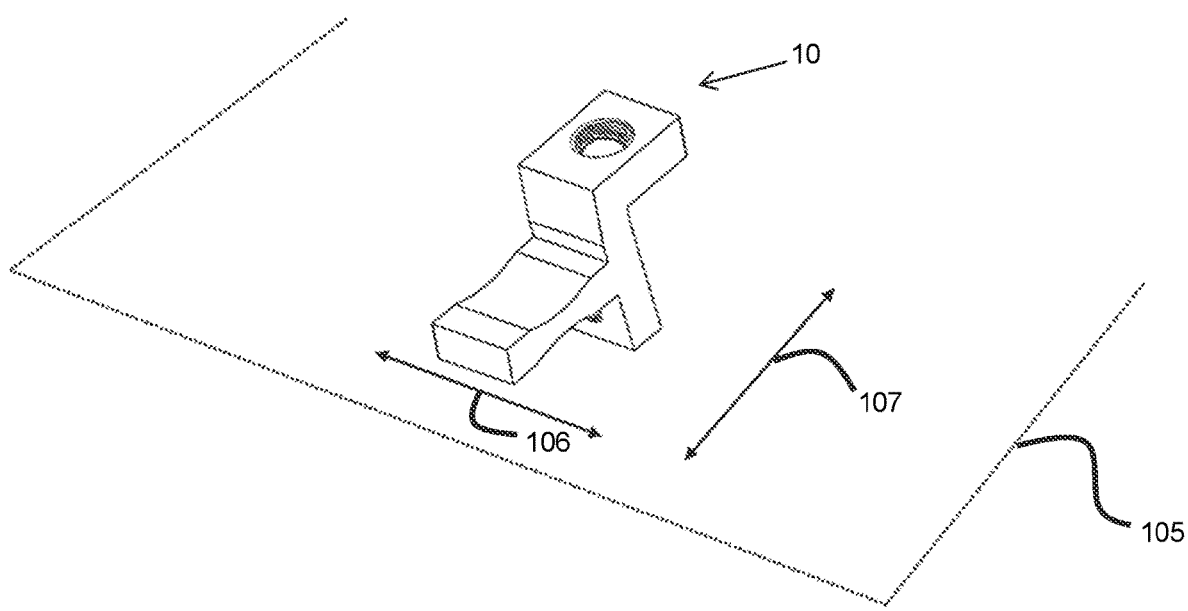
FIG. 5 depicts a view of an embodiment of the present teachings demonstrating the stabilizing features.

FIG. 3 depicts a side view of the tube holder 10 resting on a planar surface 105 that maintains the rectangular portion 20 in a generally upright position. The second end 24 of the rectangular plate portion 20 and the free end 46 of the stabilizing plate 40 co-operate to provide vertical stabilization of the tube holder 10 in two-dimensions when placed on a planar surface. With reference to FIG. 5, vertical stabilization in a first direction 106 is provided by the rectangular shape of the second end 24 of the rectangular plate portion 20 that would generally prevent the tube holder from tipping over in the direction 106. The rectangular shape of the second end 24 can be viewed as a rectangular shape leg that provide stabilizing means 50, though this leg can comprise other shapes such as for example a larger square type shape. This leg is therefore provided as an extension of the rectangular plate portion 20. This leg in and of itself is incapable on maintaining vertical stabilization in a second direction 107 that is substantially orthogonal to the first direction 106, that is without additional stabilization, the tube holder would tip over. This tipping is prevented by the end 46 of the stabilizing plate 40 which comprises a rectangular shaped end which acts as a leg and a secondary stabilizing means 51. As should be appreciated the stability offered by the stabilizing plate 40 is dependent on its position and as well as its length with such parameters being determinable by those of ordinary skill in the art in connection with the within teachings.

Figure 4:
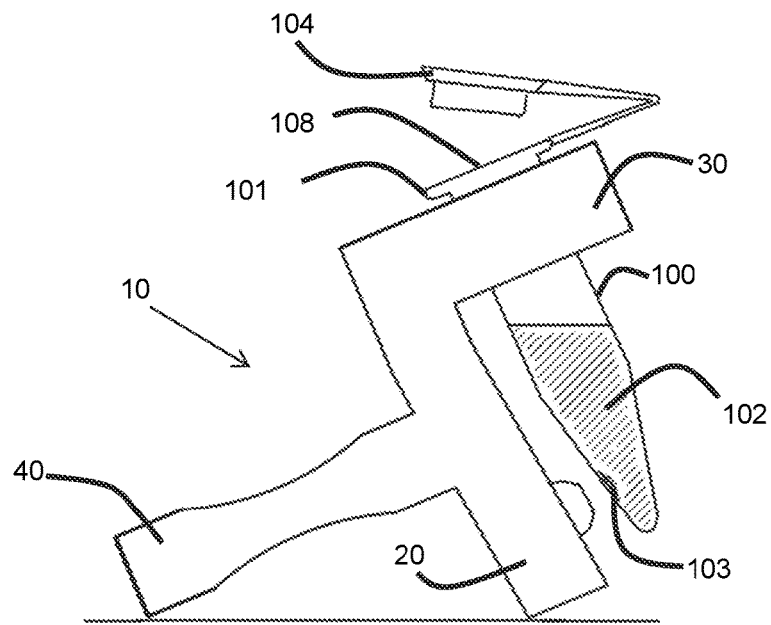
FIG. 4 exemplifies a side view of an embodiment of the present teachings resting on a flat surface in use with a PCT tube containing magnetic particles

With reference now to FIG. 4, there is depicted a side view of tube holder 10 similar to the view of FIG. 3 in use when a tube 100 is inserted into the aperture 31 and held in place. The tube 100 comprises a cap 104 and opening 108 and has lip 101 and contains sidewalls that generally define the shape of the tube in a generally tapering manner. The tube contains a liquid 102 and magnetic beads 103. In operation, the presence of the magnet 28 attached to the magnet holder 27 of the tube holder 10 generates a magnetic field that penetrates into the interior of the tube 100. The magnetic particles 103 are attracted to the magnet and are then held in a position on a sidewall of the tube 100.

Figure 6:
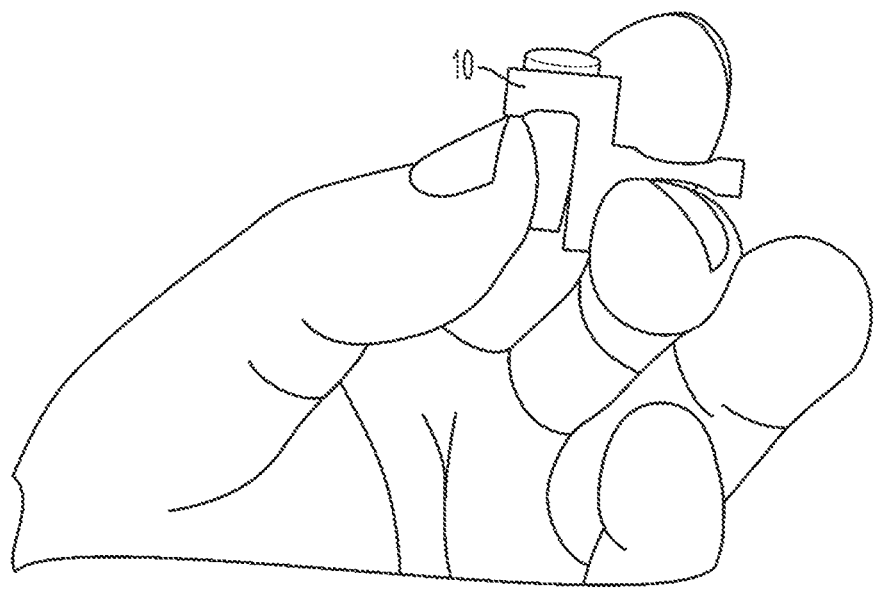
FIG. 6 depicts a picture of an embodiment of the present teachings in use with a liquid filled PCR tube being held in a user's hand.
Figure 7:
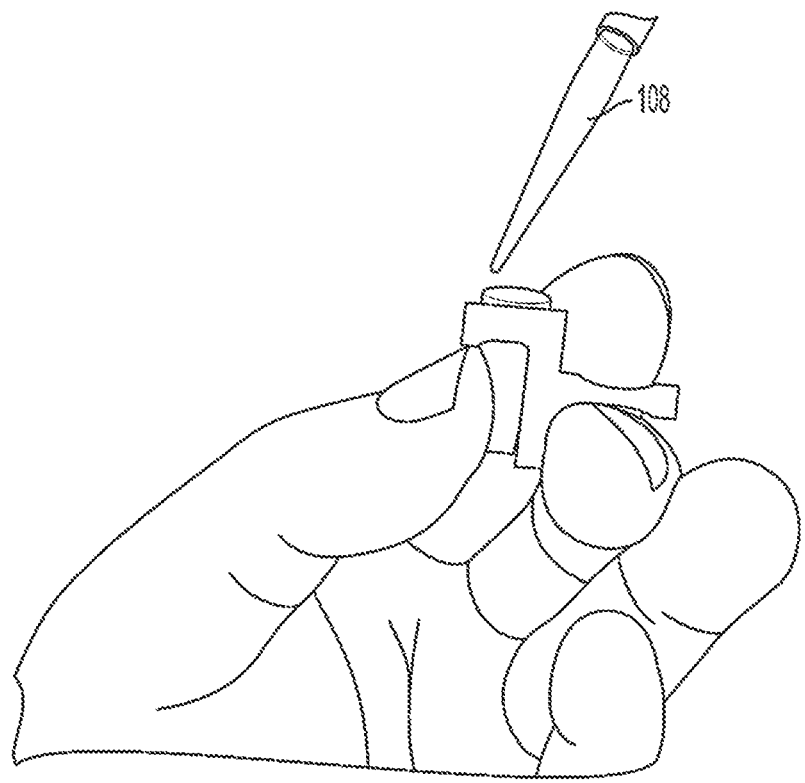
FIG. 7 depicts a picture of an embodiment of the present teachings in use with a liquid filled PCR tube being held in a user's hand with a pipette tip about to be inserted into an opening of the tube.
Figure 8:
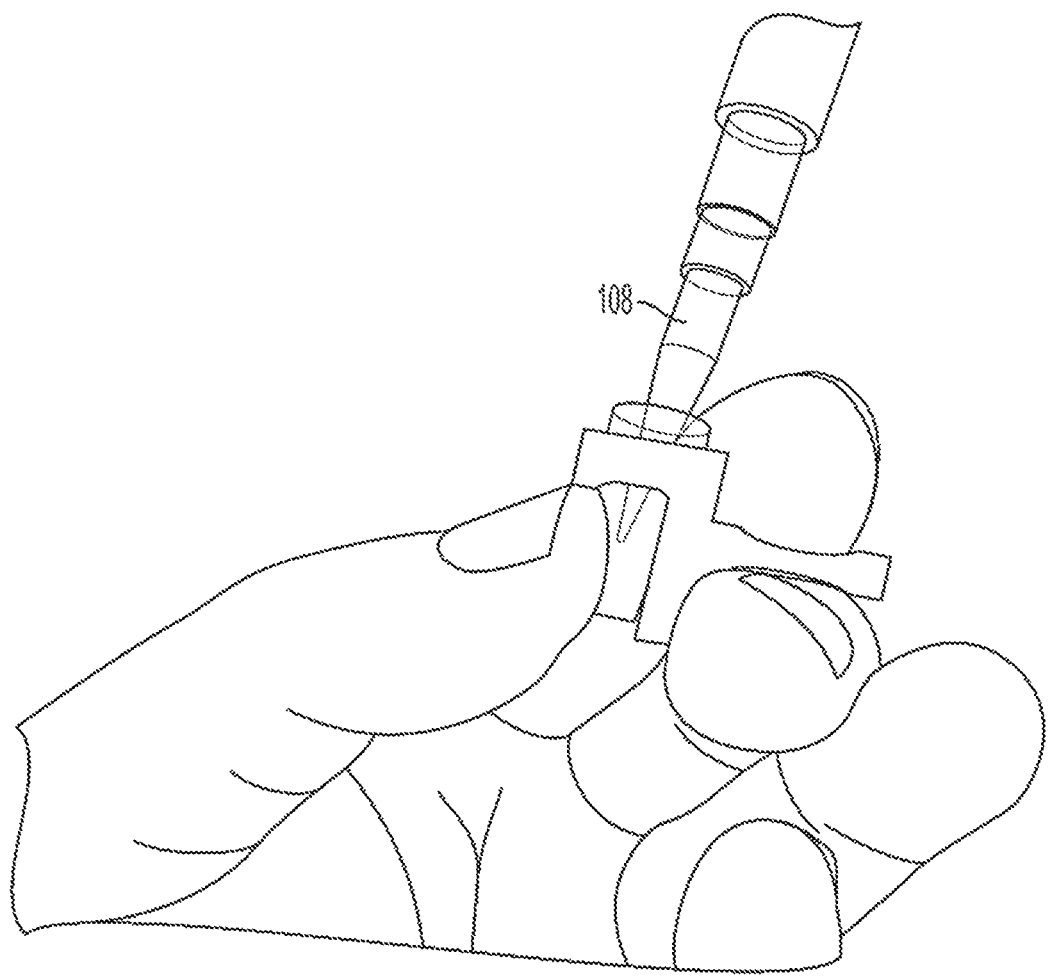
FIG. 8 depicts a picture of an embodiment of the present teachings in use with a liquid filled PCR tube being held in a user's hand with a pipette tip having been inserted into an opening of the tube and withdrawn of a fluid from the tube into the pipette.

With reference to FIGS. 6 to 8, there are depicted operation of the tube holder 10 when liquid is to be withdrawn from the tube. In operation, the tube holder is held in place between two fingers, such that two fingers engage opposing sides of the stabilizing portion 40, each finger resting in the depression 45 located on either side of the stabilizing portion 40. In preferred embodiments, the top depression 45 contacts the index finger whereas the bottom depression contacts the middle finger. In this scenario, as depicted in FIG. 6, the thumb can rest against the side wall of the tube or alternatively against the end of the rectangular holding plate 40. In some embodiments, the thumb can be used to push the tube 10 towards the magnet 28 to increase the penetration of the magnetic field into the interior of the tube so as to cause a greater or more rigorous collection of magnetic particles on the sidewall of the tube 10. As visualized in FIG. 6 when the tube holder 10 is held in this manner, a visualization of the interior of the tube is easily made with neither the tube holder 10 itself or the users fingers obstructing the view of the interior of the tube. In addition, the magnet pulls the magnetic beads/particles to the side so that the liquid can be easily visualized and removed from the tube for further processing. This holder 10 provides better visibility and manipulation of the contents therein in a more ergonomic manner which minimizes samples loss. FIGS. 7 and 8 depicts the operation of liquid removal from the tube in which a pipette tip 108 is inserted into the tube 100 and can be manipulated in a very precise manner as a result of the unobstructed view. A suction force is applied to the pipette tip so as to draw the liquid from the tube into the pipette tip.

The tube holder 10 while described with reference above to be comprised of three plates that are attached to one another through suitable attaching means such as adhesive, it should be appreciated that the tube holder can be made in a unitary piece that contains the three different plates. In some embodiments, the within described tube holder 10 can be manufactured in a unitary manner by injection molding or by 3d-printing with appropriate modification made to attach a magnet. In some embodiments, the tube holder 10 is made from a semi-rigid material which provides a sturdy structure for holding and the standing up of tubes but also provides for some flexing of the material when forces are applied to various parts. For example, in some embodiments, the flexing of the holding plate 30 in relation to the rectangular plate portion 20 can provide for more precise manipulation as it would allow a users thumb to move the tube relative to the magnet when a pipette is inserted.

One skilled in the art will appreciate that further features and advantages of methods and apparatuses in accord with the present teachings based on the above-described embodiments. According the present teachings should not be limited by what has been particularly described and shown, except as indicated by the appended claims. Any and all publication s and references cited herein are expressly incorporated herein by reference in their entirety.

The invention claimed is:

1. A tube holder comprising
a first elongated portion extending from a first end to a second end, the second end having a first stabilizing means for stabilizing the tube holder in an upright position when on a planar surface in at least a first direction, the first elongated portion having a first and a second surface, the first and second surfaces generally facing away from one another,
a second elongated portion positioned and attached at the first end, the second elongated section extending away from the first surface of the first elongated portion, an angle ($\theta_1$) between the first elongated and second elongated portions being between 75 and 105 degrees, the second elongated portion comprising tube holding means for holding a PCR tube in a position substantially parallel to the first elongated portion,
a third elongated portion that extends away from the first elongated portion on the second surface, the third elongated portion attaching to the first elongated portion at a position between the first and second end, an end of the third elongated portion opposite the first elongated portion containing second stabilizing means for stabilizing the tube holder in co-operation with the first stabilizing means in an upright position when on a planar surface in at least a second direction that is orthogonal to the first direction,
a magnet mounted on the first surface at a position between the first and second end.

2. The tube holder of claim 1 wherein the magnet is mounted between the positioning of the third elongated portion and the second end.

3. The tube holder of claim 1 wherein the angle ($\theta_1$) is 90 degrees.

4. The tube holder of claim 1 wherein an angle ($\theta_2$) between the first elongated portion and the third elongated portion is between 80 and 110 degrees.

5. The tube holder of claim 1 wherein the tube holding means comprises an aperture that extends through the thickness of the second elongated portion, the aperture being sized so as to slidably receive and hold the PCR tube.

6. The tube holder of claim 1 wherein the first and second stabilizing means comprise rectangular shaped legs.

7. The tube holder of claim 6 wherein the rectangular shaped legs are an extension of the shape of the first and third elongated portions.

8. A PCR tube holder comprising:
a rectangular plate portion having two short sides and two long sides, the rectangular plate portion extending from a first end at one of the short sides to a second end at the other of the two short sides, the rectangular plate portion having a first surface and a second surface, the first and second surfaces being opposing surfaces of the rectangular plate portion that face away from one another,
a tube holding portion that comprises a rectangular holding plate that extends away the first surface at the first end, an angle ($\theta_1$) between the first surface and the rectangular holding plate being between 75 and 105 degrees, the rectangular holding plate having an aperture that penetrates through a thickness of the rectangular holding plate, the aperture being sized so as to be able to slidingly receive and hold a PCR tube;

a stabilizing portion that comprises a rectangular stabilizing plate that extends away from the second surface at a stabilizing plate position, the stabilizing plate position being disposed between the first end and second end, an angle ($\theta_2$) between the stabilizing portion and the second surface being between approximately 80 and 110 degrees, a magnetic holding means positioned on the first surface at a position between the second end and the stabilizing plate position.

9. The tube holder of claim 8 wherein the magnetic holding means comprises an aperture that penetrates through a thickness of the rectangular plate portion.

10. The tube holder of claim 8 wherein the magnetic holding means holds a magnet.

11. The tube holder of claim 8 wherein the angle ($\theta_1$) between the first surface and the rectangular holding plate is between 80 and 90 degrees.

12. The tube holder of claim 8 wherein the angle ($\theta_1$) between the first surface and the rectangular holding plate is 90 degrees.

13. The tube holder of claim 8 wherein the stabilizing portion has a first stabilizing surface and a second stabilizing surface, the first and second stabilizing surfaces being on opposite sides of the rectangular stabilizing plate, a thickness between the first and second stabilizing surfaces being thinner at a point situated between two ends of the stabilizing portion than it is at one or both ends of the rectangular stabilizing plate.

14. The tube holder of claim 8 wherein the thickness varies from a first thickness at both ends of the stabilizing portion, to a second thickness at substantially the midpoint of the stabilizing portion, wherein the second thickness is less than the first thickness.

15. The tube holder of claim 8 wherein each of the rectangular plate portion, the stabilizing portion and the tube holding portion form a unitary piece.

16. The tube holder of claim 8 where the tube holder is made of a semi-rigid material.

17. The tube holder of claim 16 wherein the tube holder is 3d-printed or injection molded.

18. A method of removing liquid from a tube containing magnetic particles, comprising:

providing a tube holder, the tube holder comprising:
a rectangular plate portion having two short sides and two long sides, the rectangular plate portion extending from a first end at one of the short sides to a second end at the other of the two short sides, the rectangular plate portion having a first surface and a second surface, the first and second surfaces being opposing surfaces of the rectangular plate portion, a tube holding portion that comprises a rectangular holding plate that extends away the first surface at the first end, an angle between the first surface and the rectangular holding plate being between 75 and 105 degrees, the rectangular holding plate having an aperture that penetrates through a thickness of the rectangular holding plate, the aperture being sized so as to be able to slidingly receive and hold a tube;

a stabilizing portion that comprises a rectangular stabilizing plate that extends away from the second surface at a stabilizing position, the stabilizing position being disposed between the first end and second end, an angle between the stabilizing portion and the second surface being approximately 80-110 degrees, a magnetic holding means positioned on the first surface at a position between the second end and the stabilizing position, a magnet attached to the magnetic holding means;

inserting the tube into the aperture in a direction from the first end to the second end, holding the tube holder such that first and second fingers of a user's hands engage opposing sides of the stabilizing portion, pushing the tube towards the magnet with a thumb of the user's hands;

capturing magnetic particles against an inner side wall of the tube by use of a magnetic field from the magnet;

removing the liquid from the tube.

19. The method of claim 18 wherein removing the liquid comprises inserting a pipette into the tube and applying a suction force to the pipette so as to draw liquid from the tube into the pipette.

20. The method of claim 18 wherein the first and second fingers are the index and middle fingers.

* * * * *